United States Patent [19]

Dera et al.

[11] 4,301,882
[45] Nov. 24, 1981

[54] POWER-ASSISTED STEERING SYSTEM

[75] Inventors: Alain Dera, Rueil-Malmaison; Georges Itey-Bernard, Juan-les-Pins, both of France

[73] Assignee: Regie Nationale des Usines Renault, France

[21] Appl. No.: 85,139

[22] Filed: Oct. 15, 1979

[30] Foreign Application Priority Data

Nov. 9, 1978 [FR] France .................. 78 31750

[51] Int. Cl.³ .............................................. B62D 5/06
[52] U.S. Cl. ..................................... 180/153; 180/162; 280/95 R
[58] Field of Search ............... 180/152, 153, 154, 155, 180/156, 157, 158; 280/93, 95 R

[56] References Cited

U.S. PATENT DOCUMENTS

| | | | |
|---|---|---|---|
| 2,368,142 | 1/1945 | Kelley | 280/93 |
| 2,516,074 | 7/1950 | Remde | 280/95 R |
| 3,720,282 | 3/1973 | Bianchetta | 180/153 |
| 3,882,952 | 5/1975 | Crabb | 180/152 |
| 3,884,320 | 5/1975 | Leveau | 180/152 |

*Primary Examiner*—John P. Silverstrim
*Attorney, Agent, or Firm*—Beveridge, DeGrandi, Kline & Lunsford

[57] ABSTRACT

A power-assisted steering system for a motor vehicle comprises a flexible tie, the ends of which are wrapped in opposite directions around, and are anchored to drums which turn with the steering movements of the steerable guiding wheels. The tie carries at its center, rollers which follow fixed cams. The profiles of the cams are such that, during the steering of the wheels under the action of two hydraulic rams acting through racks and pinions fixed to the drums, the wheels always turn about a single common instantaneous center of turning. The rams are controlled by a distributor valve which is in turn controlled by a rocking lever which is actuated by Bowden wire cables from a steering wheel. The system is especially applicable to load handling trucks having small turning circles.

6 Claims, 3 Drawing Figures

POWER-ASSISTED STEERING SYSTEM

This invention relates to steering systems for motor vehicles, the system including guiding wheels each capable of being turned about a substantially vertical pivot under the action of a steering device such as a steering wheel. The steering system is intended especially for vehicles which must have small turning circles, for example, load handling and lifting trucks.

To achieve precise steering it is necessary, when curves are being negotiated, to give to each of the guiding wheels a steering angle different from that of the other wheel so that all the wheels of the vehicles have the same instantaneous centre of turning. This difference between the steering angles of the two guiding wheels must increase as the radius of curvature of the path which the vehicle is to follow decreases. Moreover, the smaller the ratio of wheelbase to track of the wheels of the vehicle, the greater will be this difference.

In the usual steering systems for motor vehicles known as "split axle" systems, the pivots of the two guiding wheels are coupled together by a linkage system comprising, in a horizontal plane, a track-rod connected to each wheel pivot by a coupling lever. In these steering systems, an attempt is made to satisfy the condition of rigorous fixing by the use of two coupling levers converging towards the non-steering axle and therefore forming a trapezium with the tie-rod. Nevertheless, this condition is not always satisfied in an accurate manner and, in this case, slipping takes place between the guiding wheels and the road surface. This slipping results in wear of the tires and increases the risk of the vehicle skidding.

Moreover, the deformation of the trapezium formed by the tie-rod and the coupling levers of these "split axle" steeering systems is limited. This limits the amplitude of steering movement which can be imparted to the wheels by means of such steering systems. In general, it is not possible to turn the wheels about their vertical pivot by an angle approaching 90° from the position of straight line movement.

Power assistance mechanisms commonly used in such "split axle" steering systems for the purpose of reducing the forces required of the driver are simply force amplifiers and have no effect at all upon the geometry of the steering system.

The object of the present invention is to provide a steering system which ensures steering of the guiding wheels in such a way that all the wheels on the vehicle have the same instantaneous centre of rotation, whatever may be the radius of the curved path to be followed by the vehicle.

A further object of the invention is to provide a steering system which enables a steering angle greater than about 90° and preferably a total steering angle of about 180° from lock to lock to be applied to the guiding wheels.

A still further object of the invention is to provide a power-assisted steering system which can be operated with little fatigue and with a maximum reliability.

According to this invention a power-assisted steering system for a motor vehicle comprises guiding wheels, each capable of being turned about a substantially vertical pivot under the action of a steering device such as a steering wheel, wherein a non-elastic flexible tie has its ends anchored one to each of two drums, one of which turns with each of the guiding wheels, end portions of the tie being wrapped around the drums in opposite senses with an angle of wrap greater than the maximum steering angles of the wheels when the wheels are in straight line positions; first power means act upon the two drums for turning the two guiding wheels in response to actuation of the steering device, the power means holding the tie under tension; and second means act upon the portion of the tie situated between the two drums and cause the length of this portion of the tie to vary, as a function of the turning of the guiding wheels, in such a manner as to cause each guiding wheel to turn through a steering angle such that all the wheels of the vehicle have the same instantaneous centre of turning.

The first means with advantage comprise two toothed wheels one of which turns with each of the guiding wheels, two toothed racks one of which meshes with each of the toothed wheels, and two rams, cylinders of which are integral one with each of the racks and piston rods of which are adapted to be fixed with respect to a chassis of the vehicle.

Preferably, two hydraulic rams are mounted nose-to-tail, the bottom end chamber of one of the rams being connected by a ducting system to the piston rod end chamber of the other ram and vice versa.

The two interconnecting duct systems for the rams may be connected to a two-path distributor valve having three positions and centre opening. This valve is operated by a rocking lever, that is to say a lever pivoted between its two ends, on the chassis of the vehicle. The rocking lever has two arms, one of which operates the distributor valve while the other is subjected to the action of a cable transmission operated by the steering device, and the action of restoring springs.

The second means preferably comprise one or more rollers mounted on the tie, and one or more cams which are adapted to be fixed to the chassis of the vehicle, and on which the rollers roll, the profiles of the cams being such as to impose upon the said portion of the tie, during the turning of the drums, a lateral deflection which produces the variation in length of the said portion.

An example of a steering system in accordance with the invention will now be described with reference to the accompanying diagrammatic drawings in which.

Figure 1:
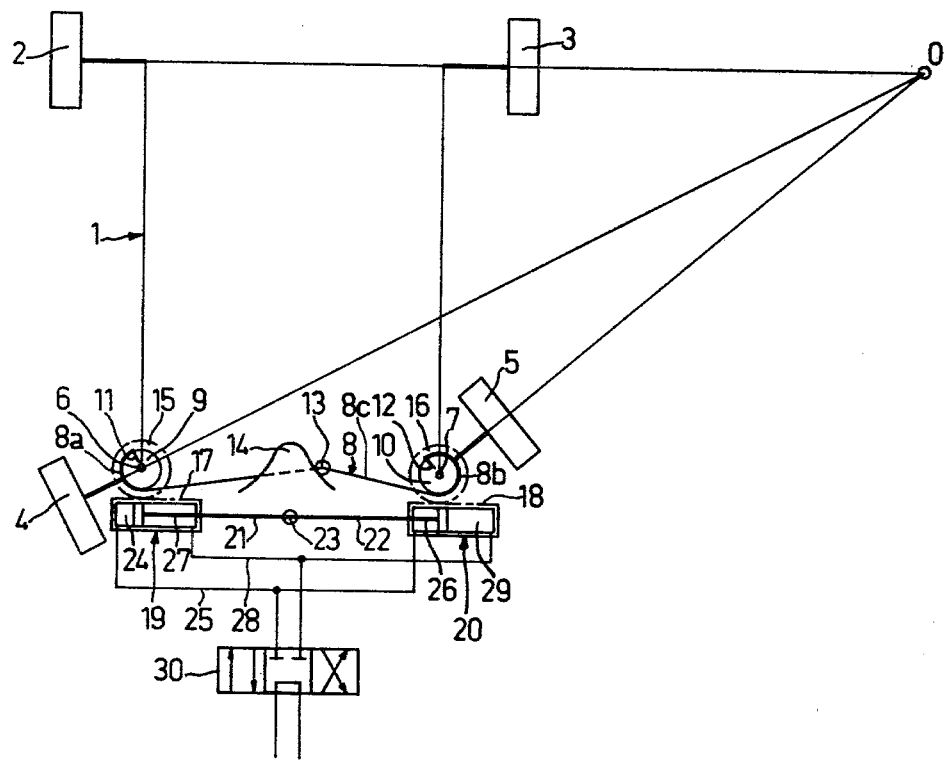
FIG. 1 is a diagram illustrating the kinematic principle of the steering system.

In FIG. 1, a vehicle 1 having four road wheels 2 to 5 is shown diagrammatically. The two wheels 2 and 3 on one axle are fixed, that is to say they are not guiding wheels, whereas the wheels 4 and 5 are capable of being turned about vertical pivots 6 and 7.

The two guiding wheels 4 and 5 are steered and have differing steering angles from each other so that the four wheels 2, 3, 4 and 5 of the vehicle 1 have the same instantaneous centre of turning 0. To obtain accurate steering, it is necessary that for all steering angles of the guiding wheels 4 and 5 these wheels shall have the same centre of turning and that this shall be situated on the common axis of the fixed wheels 2 and 3.

The steering system in accordance with this invention which enables this result to be achieved, comprises a flexible tie 8 connecting together the pivots 6 and 7 of the guiding wheels 4 and 5. This tie 8 may, for example, be a chain or a metal band or any other appropriate tie which is not subject to appreciable elongation under tensile forces.

Each pivot 6, 7 carries a circular drum 9, 10 which is coaxial and intregral with the pivot. The ends of the tie 8 are anchored at 11 and 12 one to each of the drums, 9, 10 after the end portion 8a, 8b of the tie 8 has been wrapped around the drum through an angle exceeding the maximum steering angle through which the wheel is to be turned. It can be seen from the FIG. 1 that the two end portions are wrapped in opposite directions around the drums 9 and 10. In the example shown, the angle of wrap is of the order of 180° when the wheels are both in the straight ahead position.

The tie 8 carries, preferably at the centre of its middle portion 8c between the two drums 9, 10, two rollers 13 mounted one at each side edge of the tie 8. These rollers 13 are in contact with two similar cams 14 having a convex symmetrical profile also arranged one at each side edge of the tie 8. If the central point of the tie 8 is displaced to the left from the position shown in FIG. 1, the rollers 13 mounted on the tie 8 are obliged to follow the right-hand ascending flank of the cam 14, which applies a lateral deflection to the intermediate portion 8c of the tie 8, and thus an elongation of the path of this portion 8c. The purpose of this arrangement will be described later on.

The two pivots 6 and 7 in addition each carry a coaxial toothed wheel 15, 16, which are in engagement with two toothed racks 17, 18. These racks are integrally fixed to the cylinders of two hydraulic rams 19, 20. The cylinders and with them the racks 17, 18 are movable transversely to the longitudinal axis of the vehicle. The free ends of the piston rods 21, 22 are both anchored laterally at 23 to the chassis of the vehicle 1, for example by a hinge pin and a fork.

The chamber 24 at the bottom end of the ram 19 is connected by a duct 25 to the chamber 26 at the piston rod end of the ram 20. Similarly, the piston rod end chamber 27 of the ram 19 is connected by a duct 28 to the bottom end chamber 29 of the ram 20. The two ducts 25 and 28 are supplied with oil under pressure from a source, not shown, by a distributor valve 30 having an open centre, two paths and three positions as shown. In its two extreme positions the valve 30 enables the two rams to be operated so that their cylinders move together either to the left or to the right. In the median position of the valve 30, the two rams 19, 20 are hydraulically locked.

Figure 2:
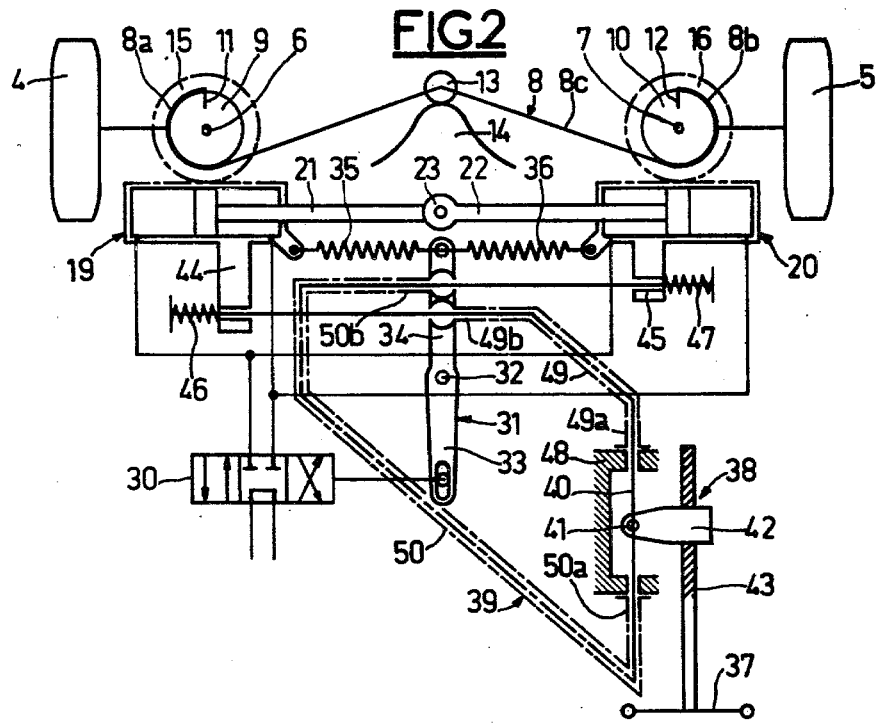
FIG. 2 is a plan view of the system, in an at-rest position, which provides straight line travel; and, FIG. 3 is a view similar to FIG. 2 but showing the system with the guiding wheels turned to steer around a curve.
Figure 3:
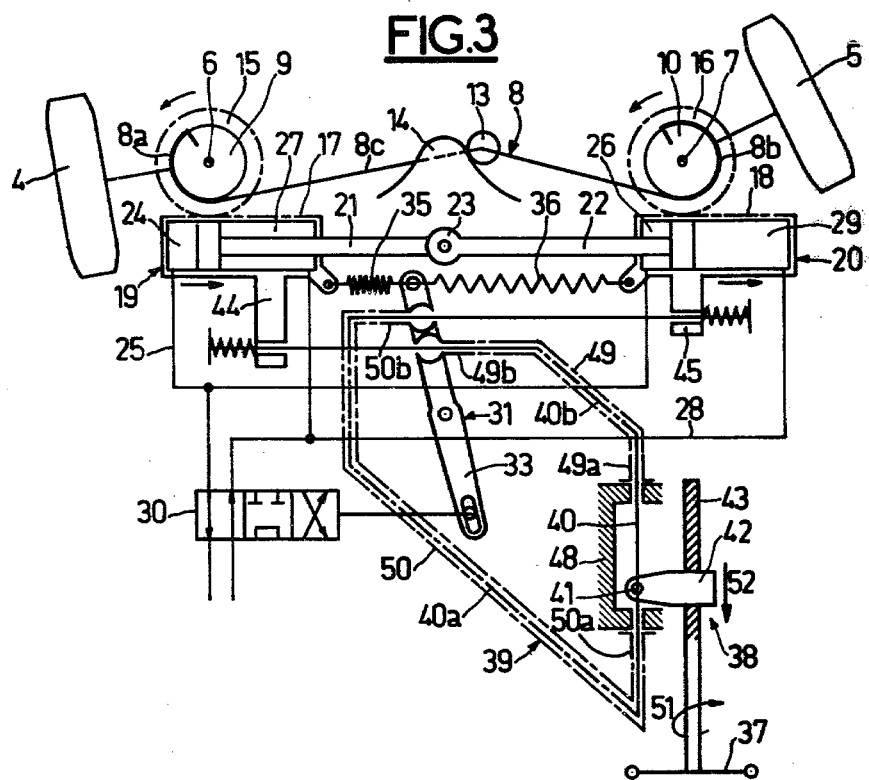

An example of a mechanism for operating the distributor valve 30 is shown in FIGS. 2 and 3, in which identical elements bear the same reference numerals. As shown in FIGS. 2 and 3, a power-assistance device comprises a two-armed rocking lever 31, mounted to pivot about a vertical axis 32 intregral with the chassis of the vehicle. The rocking lever 31 is here oriented longitudinally of the vehicle and the operating member for the slide of the distributor valve 30 is pivoted to the free end of the arm 33 of the rocking lever 31, for example by a pivot engaged in an elongated slot. To the free end of the other arm 34 of the rocking lever 31 are attached two tension springs 35, 36. At their other ends, these springs 35, 36 are connected one to each of the cylinders of the two rams 19, 20.

The rocking lever 31 is actuated from the steering device, for example from a steering wheel 37, by passing through a screw and nut system 38 and a cable transmission 39 comprising a cable 40 fixed at 41 to a nut 42 in engagement with a screw 43 on a steering column.

The cable 40 comprises two branches 40a, 40b extending from its fixing point 41 in two opposite directions across the arm 34 of the rocking level 31 as far as the rams 19, 20. The cylinders of the rams 19, 20 each comprises a pierced fitting 44, 45, through which one end of the cable 40 passes. The ends of the cable 40 act against the fittings 44, 45 on their sides remote from the rocking lever 31 through compression springs 46, 47 which hold the cable 40 under tension.

The cable 40 is surrounded, along the portion of each of its arms 40a, 40b extending from the steering box 48 enclosing the screw and nut system 38 to the arm 34 of the rocking lever 31, by a sleeve or tube 49, 50. The two ends 49a, 49b and 50a, 50b of each arm 40a, 40b bear against the steering box 48 and against the opposite sides of the rocking lever 31.

Referring to FIGS. 2 and 3 a description is now given below of the mode of operation of the steering system in accordance with this invention.

In FIG. 2, the guiding wheels 4, 5 are in the position of straight line travel. The rocking arm 31 is not actuated and is held in a control datum position by the two springs 35, 36. The slide of the distributor valve 30 occupies its median position, in which the two rams 19, 20 are hydraulically locked. The rollers 13 mounted on the tie 8 occupy the highest position on the cams 14, that is to say the portion 8c of the tie 8 situated between the two drums 9, 10 has a maximum length.

FIG. 3 illustrates the steering system in action, that is to say during turning of the guiding wheels 4, 5. Rotation of the steering wheel 37 in the sense indicated by an arrow 51 causes a displacement of the nut 42 in the direction indicated by an arrow 52. The cable 40, which is fixed to the nut 42, follows the movement of the nut so that its branch 40a situated between the nut 42 and the fitting 45 of the ram 20 is relaxed and its branch 40b situated between the nut 42 and the fitting 44 of the ram 19 is tensioned. The tube 49 surrounding the tensioned branch 40b of the cable 40 between the steering box 48 and the lever 31, is thus compressed and, due to the fact that its end 49a bears against the fixed steering box 48, its opposite end 49b which bears against the rocking lever 31 exerts upon the rocking lever a thrust which causes the rocking lever 31 to pivot anti-clockwise (see FIG. 3). The arm 33 of the rocking lever 31 thus moves to the right in FIG. 3 and displaces the slide of the distributor valve 30 into one of its two end positions.

The connecting ducting 25 between the two rams 19, 20 is then vented, while the connecting ducting 28 is supplied with pressurized hydraulic fluid. The hydraulic locking of the two rams 19, 20 is thus released, the chambers 24 and 26 being vented and the chambers 27 and 29 being supplied with pressurized fluid. Due to the fact that the piston rods 21, 22 of the two rams 19, 20 are connected at 23 to the vehicle chassis, the ram cylinders 19, 20 mounted nose-to-tail move in the same direction relative to their pistons, that is to say to the right in FIG. 3. The racks 17, 18 which are integral with the two ram cylinders 19, 20 thus cause pivoting of the toothed wheels 15, 16 of the pivots 6, 7 with which they are in engagement. This causes the wheels 4, 5 to turn about the pivots 6, 7.

It should be noted that the effective area of the bottom end chamber 29 of the ram 20 is larger than the effective area of the piston rod end chamber 27 of the ram 19, due to the presence of the piston rod 21. The force with which the ram cylinder 20 is pushed to the right is therefore greater than the force with which the ram cylinder 19 is pushed to the right. The tie 8 is therefore always tensioned.

The drums 9, 10 which are integral with the pivots 6, 7 turn with the pivots anti-clockwise (FIG. 3) during the movement to the right of the ram cylinders 19, 20. Due to this fact, the end portion 8a of the tie 8 wrapped around and anchored on the drum 9 unwraps from this drum, while the end portion 8b of the tie 8 wrapped around and anchored on the drum 10 wraps further around this drum. The portion 8c of the tie 8 situated between the two drums 9 and 10 therefore moves to the right in FIG. 3 and the rollers 13 which are initially situated at the summits of the cams 14 in the position of straight line travel as shown in FIG. 2 descend the right-hand flanks of the cams 14. The deflection, under the action of the rollers 13 in contact with the cams 14, of the path of the portion 8c of the tie 8 therefore decreases. As a result of the fact that the force causing the movement to the right of the ram cylinder 20 is greater than that exerted upon the ram cylinder 19 and that the rollers 13 rolling on the cams 14 permit shortening of the portion 8c of the tie 8, the drum 10 turns more rapidly and further than the drum 9, with the result that the wheel 5 turns through a larger steering angle than the wheel 4, the tie 8 always remaining under tension.

As the rocking lever 31 pivots anti-clockwise the spring 36 is tensioned. This tension in the spring 36 increases progressively as the ram cylinder 20 moves to the right, the rocking lever 31 being held by the compressed sheath 49 in the position of FIG. 3. However, the ram cylinder 19 also moves to the right, so that the tension in the branch 40b of the cable 40, the end of which bears against the fitting 44 of the ram cylinder 19, decreases, as also does the compression in the tube or sheath 49. As soon as the tension exerted by the spring 36 on the rocking lever 31 balances the thrust exerted by the tube or sheath 49 on the rocking lever 31, the rocking lever turns clockwise to the position of FIG. 2 and brings the slide of the distributor 30 to the median position, in which the two rams 19, 20 are hydraulically locked and hold the two guiding wheels 4 and 5 in the position defined by the rams 19, 20 and the tie 8, the spring 36 being still tensioned and the tube 49 still in compression. This situation persists as long as the driver holds the steering wheel 37 in the position into which it has been turned.

To bring the wheels 4, 6 back to the position of straight line travel (FIG. 2) it is only necessary to let go of the steering wheel 37. The still tensioned spring 36 then causes the rocking lever 31 to pivot further clockwise. The rocking lever 31 thus brings the slide of the distributor valve 30 into the end position opposite to that shown in FIG. 3, so that the chambers 24 and 26 of the rams are now supplied with pressurized fluid and the chambers 27 and 29 are vented. The cylinders of the rams 19, 20 move to the left, bringing the steering wheel and the wheels 4, 5 into the position of straight line travel, while the rollers 13 re-ascend to the summits of the cams 14, lengthening the portion 8c of the tie 8 situated between the two drums 9, 10, and the spring 36 stretches as far as the position of FIG. 2. Alternatively the two springs 35, 36 in equilibrium, bring the rocking lever 31 back to the at-rest central position, so that the slide of the distributor valve 30 again occupies its median hydraulic locking position for the two rams 19, 20.

The system in accordance with this invention therefore ensures automatic power-assisted return of the guiding wheels to the position of straight line travel.

The profiles of the cams 14 may be established by calculation or by trial and error in order to ensure exact turning conditions for the guiding wheels, that is to say so that, for all steering angles, all the wheels of the vehicle shall have the same instantaneous centre of turning.

Various modifications may be made. For example, the conversion of the rotary movement of the steering wheel into a translatory movement of the cable transmission may be carried out, not only by a screw and nut system, but also by any other conventional reversible system which ensures conversion of the desired movement. The racks 17, 18 may be carried by the piston rods 21, 22.

Moreover, although in the illustrated example, the steering system is applied to a vehicle with rear guiding wheels, notably a vehicle of the lift or handling truck type, due to the improved handling provided by such an arrangement, the steering system according to this invention may of course be used for front guiding wheels.

We claim:

1. A power-assisted steering system for a motor vehicle comprising a pair of guiding wheels; substantially vertical pivot means mounting said guiding wheels for steering turning movement; a manually operable steering device; a pair of drums; means rotatably mounting said drums for turning movement, one with each of said guiding wheels; a non-elastic flexible tie, said tie having two end portions and an intermediate portion; means anchoring one said end portions to each of said drums with said end portions being wrapped in opposite senses one around each of said drums; a pair of double-acting rams each having a first portion connected to the chassis of the vehicle and a second portion movable with respect to the chassis of the vehicle, each of said second portions cooperating with said pivot means to turn one of said guiding wheels as said second portions move with respect to the chassis of the vehicle; a distributor valve capable of assuming any one of three valve positions, said distributor valve in the first valve position adapted to couple a hydraulic source to said rams to move said second portions in a first direction relative to the chassis of the vehicle to turn the guiding wheels in a first direction, said distributor valve in the second valve position adapted to couple the hydraulic source to said rams to move said second portions in a second direction relative to the chassis of the vehicle to turn the guiding wheels in the opposite direction, said distributor valve in the third valve position adapted to isolate the hydraulic source from said rams; control means responsive to operation of said steering device for causing said distributor valve to assume one of the three valve positions; at least one roller mounted on said intermediate portion of said tie; and at least one cam secured to the chassis of the vehicle and cooperating with said roller to deform said intermediate portion of said tie as said guiding wheels turn, whereby said steering system provides differential turning of said pair of guiding wheels to cause said pair of guiding wheels to have the same center of turning.

2. A steering system as claimed in claim 1 in which said control means includes a rocking lever pivotably mounted on the chassis of the vehicle; said rocking lever normally assuming a central position and pivotable to a first pivoted position and a second pivoted position; first connection means connecting one end of said rocking lever to said distributor valve for movement of said distributor valve to the first distributor valve position in response to pivoting of said rocking lever to the first pivotal position and movement of said distributor valve to the second distributor valve position in response to pivoting of said rocking lever to the second pivoted position; second connection means connecting the other end of said rocking lever to said steering device; and spring means for urging said rocking lever to the central position.

3. A steering system as claimed in claim 2 in which said second connection means comprises engaging means providing translatory movement in response to operation of said steering device; a cable secured to said engaging means for movement therewith, said cable having two branches extending from said engaging means; anchoring means anchoring said cable branches to said second portions of said rams; and two cable sheaths encircling said two cable branches and extending between said engaging means and said rocking lever.

4. A steering system as claimed in claim 3 in which said spring means couple said other end of said rocking lever to said second portions of said rams.

5. A steering system as claimed in claim 1 in which said first portions of said rams comprise the pistons and piston shafts of said rams, and said second portions of said rams comprise the cylinders of said rams.

6. A steering system as claimed in claim 5 in which each of said ram cylinders includes a rack, and in which each of said pivot means includes a toothed wheel, said toothed wheels engaging said racks to turn said pivot means in response to movement of said cylinders.

* * * * *